United States Patent [19]

Blessinger

[11] Patent Number: 4,680,651

[45] Date of Patent: Jul. 14, 1987

[54] TIMING SIGNAL DROPOUT COMPENSATION CIRCUIT

[75] Inventor: Kurt V. Blessinger, Cardiff-By-The-Sea, Calif.

[73] Assignee: Eastman Kodak Company, Rochester, N.Y.

[21] Appl. No.: 897,890

[22] Filed: Aug. 19, 1986

[51] Int. Cl.⁴ .................. H04N 5/93; H04N 5/782
[52] U.S. Cl. .................. 360/38.1; 360/51; 358/336; 358/337
[58] Field of Search .......... 360/9.1, 11.1, 38.1, 360/51, 36.1; 358/310, 314, 327, 335, 336, 906, 213, 337, 320; 377/60; 331/25

[56] References Cited

U.S. PATENT DOCUMENTS

| | | |
|---|---|---|
| 3,366,732 | 1/1968 | Holmberg . |
| 3,571,525 | 3/1971 | Miller . |
| 3,865,981 | 2/1975 | Welch et al. ............ 360/51 X |
| 3,879,753 | 4/1975 | Dunn .................... 331/25 X |
| 3,989,893 | 11/1976 | Eisema ................... 358/336 |
| 4,199,780 | 4/1980 | Taylor . |
| 4,203,134 | 5/1980 | Christopher et al. . |
| 4,322,638 | 3/1982 | Lee et al. ............... 377/60 X |
| 4,322,752 | 3/1982 | Bixby .................... 358/213 |
| 4,330,796 | 5/1982 | Anagnostopoulos ....... 358/906 X |
| 4,376,289 | 3/1983 | Reitmeier et al. ........ 360/38.1 X |
| 4,438,467 | 3/1984 | Schaller et al. .......... 360/77 |
| 4,467,373 | 8/1984 | Taylor et al. ............ 360/38.1 |
| 4,487,529 | 12/1984 | Douty .................... 405/261 |
| 4,496,995 | 1/1985 | Colles et al. ............ 360/9.1 |
| 4,499,570 | 2/1985 | Immink et al. ........... 369/48 |
| 4,509,078 | 4/1985 | Kuroda .................. 358/160 |

Primary Examiner—Raymond F. Cardillo
Assistant Examiner—Wayne R. Young
Attorney, Agent, or Firm—William F. Noval

[57] ABSTRACT

In video reproduction apparatus in which video information representing a scene is recorded in a plurality of longitudinal tracks on magnetic tape, a timing signal is also recorded in a timing track parallel to the video information tracks. A dropout in the timing signal reproduced from the timing track causes degradation in the reproduced scene. There is disclosed a circuit for compensating for dropouts in the timing signal track to reduce such reproduced image degradation. A phase lock loop circuit produces a video sampling signal which is phase locked to the reproduced timing signal, and which has a frequency that is a multiple of said timing signal. The phase lock loop circuit has a loop bandwidth which tracks variations in frequency produced by flutter. A timing signal dropout detector detects an out of lock condition of the reproduced timing signal and produces a control signal which causes the phase lock loop circuit to continue to produce a video sampling signal during the dropout period of the timing signal.

4 Claims, 7 Drawing Figures

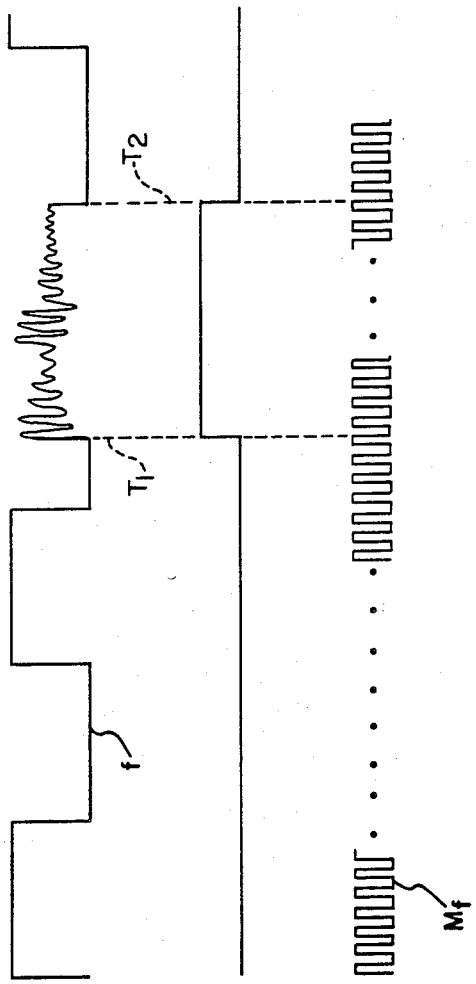

TIMING SIGNAL DROPOUT COMPENSATION CIRCUIT

BACKGROUND OF THE INVENTION

In general, this invention relates to video reproduction apparatus in which video information is recorded in a plurality of longitudinal tracks on magnetic tape along with a timing signal recorded in a timing track parallel to the video information tracks. More particularly, this invention relates to video reproduction apparatus in which dropouts in the reproduced timing signal are compensated so that degradation of a reproduced video image caused by such dropouts are reduced.

Although most video reproduction devices utilize a spinning magnetic head to record video information on magnetic tape in tracks which run either substantially perpendicular to the direction of travel of the tape or at an angle to the direction of travel of the tape, various video reproduction devices have been proposed in which the video information is recorded in a plurality of parallel tracks which run longitudinally in the direction of tape movement. Such longitudinal reproduction devices have been especially useful in the motion analysis of fast moving phenomena in slow motion. Such a motion analyzer device is disclosed in commonly-assigned U.S. Pat. No. 4,496,995, issued Jan. 29, 1985. As disclosed therein, the motion analyzer entails the recording of a great number of images during an event at high tape speed and high frame rate, and reproducing the images more slowly at a lower frame rate and lower tape speed to analyze the movement which has occurred in step by step progression. Applications for such a motion analysis system include malfunctions in high speed machinery, movements of an athlete, testing of safety equipment, shattering of an object, etc. As disclosed in the latter patent, the motion analyzer includes a video camera, a variable speed magnetic tape processor and a video display monitor. The camera is read out in block format so that a plurality of lines of video information that correspond to rows of photosites in the camera are simultaneously recorded on magnetic tape in longitudinal parallel tracks. In order to play back the video signals recorded in the plurality of parallel tracks and to convert the parallel signals into a sequential signal which may be used with standard video monitors, a timing track is recorded parallel to the video information tracks at the time of recording. Upon playback, the timing signal is reproduced and processed to effect synchronous timing and control of the reproduced video signal.

Ideally, to effectively reproduce the timing signal and video information from the tape, the tape is moved past the playback head at a constant speed over the length of the recorded video signal. In reality, such ideal conditions are difficult to achieve and timing errors which may result in severely degraded or totally incomprehensable video displayed information may occur. Thus, variations in the speed of the tape moving past the playback head may be caused by localized tape stretch, tape vibration, and/or fluctuations in the speed of the tape transport mechanism. This timing error called flutter occurs in both the video information and simultaneously in the timing signal played back from the timing track. Since the timing signal is used to process the video information reproduced from the video tracks, the timing signal processing circuitry should be effective in following the flutter in tape so that the frequency of the timing signal will change proportionately to the flutter and recovery of video information from the tape will change proportionately. Difficulty arises, however, when the timing signal processing circuitry is not compensated to take into account dropouts in the timing track, which could effect poor recovery of the video information and severe degradation in the quality of the reproduced scene.

SUMMARY OF THE INVENTION

According to the present invention, there is provided in video reproduction apparatus in which video information is recorded in a plurality of longitudinal tracks on magnetic tape and in which a timing signal is also recorded in a timing track parallel to the video informatio tracks, a timing signal dropout compensation circuit which causes accurate reproduction of the video information to continue during the period of timing signal dropout. According to an aspect of the invention, the timing signal dropout compensation circuit includes a phase lock loop circuit for producing a video sampling signal which is phase locked to and which has a frequency which is a multiple of the frequency of said timing signal. The phase lock loop circuit has a loop bandwidth which is sufficient to follow the flutter of the tape as it is moved past a reproducing head. Means are provided for detecting a dropout in the reproduced timing signal and for producing a dropout control signal which causes the phase lock loop circuit to continue to produce said video sampling signal during the period of the timing signal dropout.

According to another aspect of the present invention, the timing signal dropout detecting circuit includes another phase lock loop circuit which produces a signal phase locked to the reproduced timing signal and which detects an out of lock condition and produces a dropout control signal in response thereto. This signal controls a sample and hold circuit to hold a voltage control signal for a voltage controlled oscillator of the first phase lock loop until the reproduced timing signal returns.

BRIEF DESCRIPTION OF THE DRAWINGS

The invention will be described in detail with reference to the drawings in which like elements are provided with like numbers.

FIG. 5A, 5B and 5C are waveform diagrams illustrating the operation of the circuit of FIG. 4.

DESCRIPTION OF THE PREFERRED EMBODIMENT

In the following description of the preferred embodiment of timing signal dropout compensation circuit according to the present invention, it will be described as included in a motion analyzer which utilizes recording a video information along with a timing signal in parallel longitudinal tracks on magnetic tape. It will be understood, however, that the compensation circuit of the present invention may be used in other applications in which timing signals are recorded along with multiple tracks of information on other recording media, such as magnetic discs or optical discs.

The application in which the embodiment of the present invention will be described relates to a motion analyzer which records scene information at a high frame rate and plays back such information at a slower frame rate, thereby allowing slow motion analysis of a changing event, such as a moving object. (A motion analyzer and associated timing and control circuits are disclosed, for example, in commonly assigned U.S. Pat. No. 4,496,995, the disclosure of which is hereby referred to for a more detailed description of such equipment.) The imager frame rate used for recording is variable between 30 and 1,000 frames per second depending upon the desired speed reduction while the display frame rate is constant at 30 frames per second. To effect this, the image frames are recorded at a high tape speed and frame rate and reproduced at a lower tape speed and frame rate.

Figure 1:
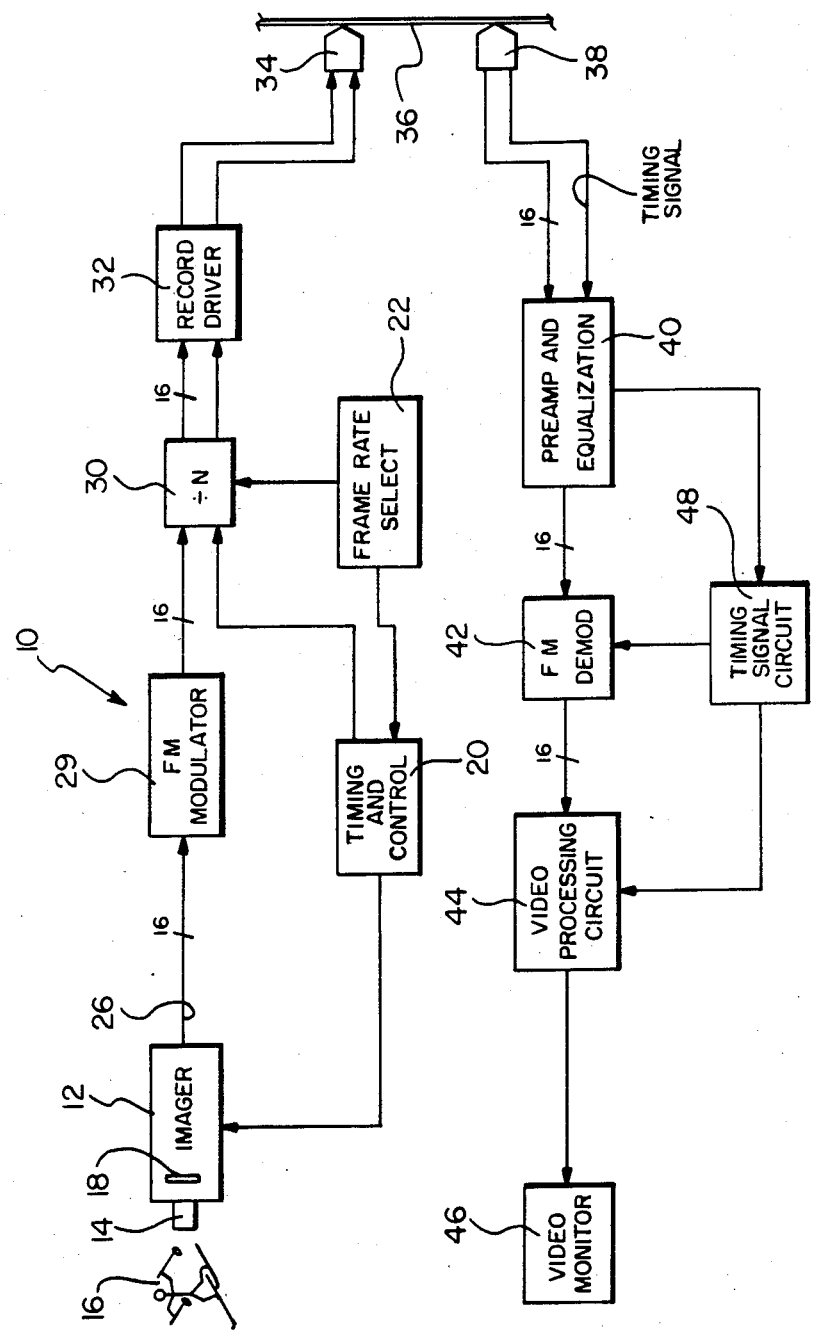
FIG. 1 is a block diagram of video reproduction apparatus in which the compensation circuit of the present invention may be used.

Referring to FIG. 1, there is shown in functional block diagram a motion analyzer including an embodiment of the present invention. The motion analyzer 10 includes and imager 12 having a lens 14 which images a scene 16 onto a sensor 18. Imager 12 is controlled by timing and control circuit 20 which supplies suitable timing signals to imager 12 as a function of the operator selectable frame rate and speed reduction entered into selector 22. As described in greater detail in copending U.S. patent application Ser. No. 875,822, entitled SYNCHRONOUS FM DIGITAL DATA PROCESSOR, motion analyzer 10 may be operated at frame rates of 30, 60, 125, 250, 500, and 1000 frames per second for recording and at a frame rate of 30 frames per second for playing back. In such case, the operator would select the appropriate frame rate by select circuit 22.

Figure 2:
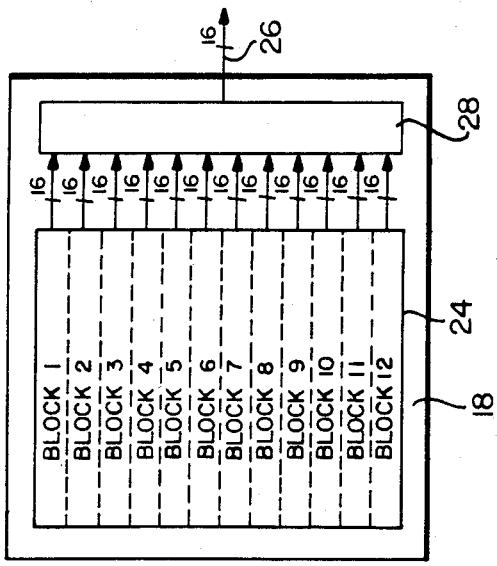
FIG. 2 is a functional block schematic diagram of a block readable area imager.
Figure 3:
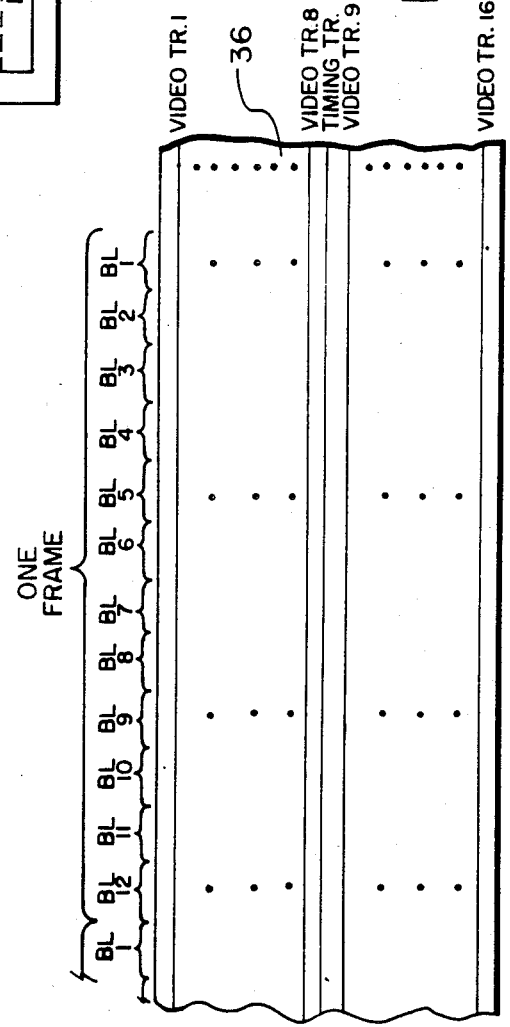
FIG. 3 shows the format of video information and timing signal recorded in longitudinal tracks on magnetic tape.

Sensor 18 is a "block" readable area image sensor. The basic concept of a block readout of a solid state area image sensor and the timing and control thereof is disclosed in U.S. Pat. No. 4,322,752 in the name of James A. Bixby and in U.S. Pat. Nos. 4,322,638 in the name of C. N. Anagnostopoulos et al. (See also U.S. Pat. No. 4,496,995). Although the referenced patents provide detailed information, a brief description of the concept of block readout may be illustrated with respect to FIGS. 2 and 3. FIG. 2 shows a block readable sensor 18 that includes an array of photosites (not shown individually) arranged in rows and columns (e.g. 192 rows and 240 columns). For purposes of readout, sensor 18 is formatted into 12 blocks of 16 photosite rows each. Although demarcation between blocks is indicated by dashed lines, it will be understood that no physical demarcation on the sensor itself is necessary. Through appropriate control circuitry, (as described more fully in the latter patent application) blocks 1-12 are sequentially read out of image area 24 of sensor 18 and applied to an output line 26 by means of block multiplexer 28. As a result of such readout, block information is produced in series and each block of information contains 16 row signals arranged in parallel.

Referring again to FIG. 1, each of the 16 line signals that constitutes the analog video signal from imager 12 is frequency modulated in FM modulator 28 on a carrier having a black level frequency of 4.166 MHz and a white level frequency of 6.66 MHz. All 16 frequency modulated video signals are applied to a divide by N circuit 30 in which each frequency signal is divided by a factor of N. The value of "N" is equal (to the nearest integer) to the maximum selectable speed reduction divided by the selected speed reduction of the ratio of the maximum record frame rate to the selected record frame rate. Thus, if the maximum frame rate is 1000 frames per second, and the selected record frame rate is 125 frames per second, then N would be equal to 8.

A timing signal from circuit 20 is also applied to divide by N circuit 30.

The 16 parallel video information signals and timing signal are applied to record driver circuit 32 which drives multi-magnetic head 34 to record the video information in 16 parallel longitudinally extending tracks on tape 36. The timing signal is recorded in a timing track which runs parallel to the video tracks. This is shown more clearly in FIG. 3 where the 16 row signals are recorded on video tracks 1-16 and the timing signal is recorded in a timing track which runs parallel to the video tracks between video track 8 and video track 9. As shown, the signals from each block are recorded sequentially on tape 36 so that a frame of video information is recorded by recording the 16 lines from each of sequential blocks 1-12.

As disclosed in the above-mentioned copending patent application Ser. No. 875,822, tape 36 is played back at the same speed irrespective of the speed at which the data was recorded on the tape. Playback head 38 has a plurality of magnetic heads which simultaneously reproduce 16 parallel video signals from video tracks 1-16 along with a timing signal from the timing track. The video signals and timing signal are processed by preamplification and equalization circuit 40 and the 16 video signals are applied to FM demodulator 42 which demodulates the 16 lines of FM video signals into 16 analog video signals. Video processing circuit 44 reformats the 16 parallel video signals into a sequential video signal to effect an NTSC video signal which is applied to video monitor 46 to play back the scenes recorded on tape 36.

Figure 4:
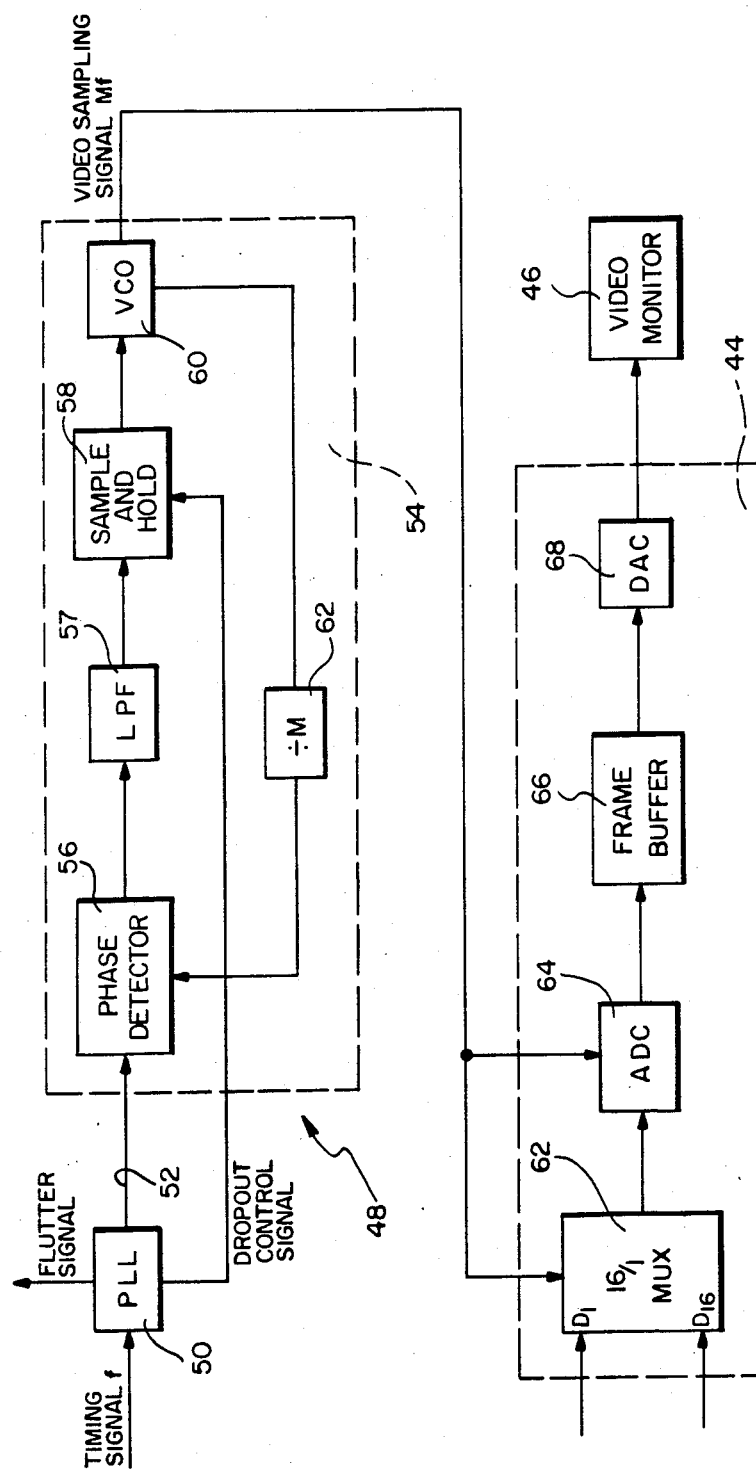
FIG. 4 is a block diagram showing an embodiment of the compensation circuit of the present invention as used in the apparatus of FIG. 1.

Timing signal dropout compensation circuit 48 according to the present invention, receives the timing signal from circuit 40 and produces timing signals which are applied to circuits 42 and 44 to effect demodulation and reformatting of the video signals reproduced from tape 36. A preferred embodiment of timing signal circuit 48 is shown in FIG. 4. As shown, circuit 48 includes a first phase lock loop (PLL) circuit 50 which receives the timing signal from preamplification and equalization circuit 40. PLL circuit 50 has a loop bandwidth which follows the flutter of tape 36 and produces a noise free square wave signal (FIG. 5A) applied to output channel 52. Circuit 50 demodulates any flutter which has been added to the signal played back from tape 36 and applies a flutter correction signal to FM demodulator 42. PLL circuit 50 also produces a dropout control signal upon detection of a loss of phase lock of the timing signal (which indicates a dropout in the timing track). An exemplary commercially available phase lock loop circuit which will accomplish these functions is the XR-2213 Model supplied by the EXAR Company of Sunnyvale, Calif.

The square wave timing signal from the first PLL circuit 50 is applied to a second phase lock loop circuit 54 via output channel 52. PLL circuit 54 produces a video sampling signal (FIG. 5C) which is used to sample the 16 channels of video information reproduced from tape 36. The video sampling signal has a frequency Mf which is a multiple of the frequency of the timing signal.

PLL circuit 54 includes a phase detector circuit 56, a low pass filter (LPF) 57 and sample and hold circuit 58, a voltage controlled oscillator (VCO) 60 and a divide-by-M circuit 62. Both PLL circuit 50 and PLL circuit 54 have sufficient loop bandwidths to permit them to track changes in frequency of the timing signal due to flutter of the tape as it is moved past the playback head 38.

If a dropout should occur in the timing track of tape 36 that produces a disruption in the timing signal supplied to circuit 48, PLL circuit 50 produces a dropout control signal which is applied to sample and hold circuit 58 to cause circuit 58 to hold the last control voltage applied to VCO 60. During the period of the dropout, the loss of the timing signal does not affect production of the video sampling signal (applied to video processing circuit 44) which reflects the last flutter condition of the timing signal before dropout. Thus, there is no loss in the quality of the image displayed on video monitor 46. As soon as PLL circuit 50 re-establishes phase lock with the reproduced timing signal the dropout control signal ceases and sample and hold circuit 58 is disabled. PLL circuit 54 resumes tracking the timing signal recovered from the timing track of tape 36.

The video sampling signal produced by PLL circuit 54 is applied to video processing circuit 44. As shown in FIG. 4, circuit 44 includes a multiplexer 62, analog to digital converter (ADC) 64, frame buffer 66, and digital to analog converter (DAC) 68. Multiplexer 62 has a plurality of inputs $D_1-D_{16}$ which receive the parallel channels of video information from tape 36. The video sampling signal causes multiplexer 62 to sequentially sample the inputs $D_1-D_{16}$ and to apply the output to ADC 64, which converts the sampled analog signal into a digital signal. The digital signal is written into frame buffer 66 at the video sampling signal frequency and written out from frame buffer 66 in a line sequential manner in the format of the standard broadcast video signal. The line sequential digital signal read out of frame buffer 66 is converted to an analog signal by DAC 68 which is applied to video monitor 46 to display an image of the video information recorded on tape 36.

The operation of the preferred embodiment of the invention shown in FIG. 4 will be more clearly understood with respect to the waveform diagrams of FIGS. 5A-5C. The timing signal received from equalization circuit 40 is processed by PLL circuit 50 to produce a square wave TTL timing signal (FIG. 5A) at the same frequency f as the timing signal reproduced from timing track on tape 36. PLL circuit 50 has a loop bandwidth which permits it to follow any flutter induced frequency variations in the timing signal. As shown in FIG. 5A, the signal is disrupted at a time $T_1$ which corresponds to a dropout or loss of timing signal on tape 36. This is shown as an irregular waveform of random frequency between times $T_1$ and $T_2$, the duration of the dropout. Phase lock loop circuit 50 loses lock during the dropout period. Since phase lock loop circuit 54 also has a loop bandwidth which allows it to follow the flutter of the timing signal, its inertia is not high enough to compensate for the loss of timing signal during the signal dropout. Thus, during this period the video sampling frequency would quickly lose lock with the video information and an undesirable degradation of the image displayed on monitor 46 would occur. In the case of motion analysis of an event which cannot be easily duplicated, this degradation of image may nullify or seriously affect the results of the motion analysis experiment causing waste of money, time and sophisticated equipment.

According to the present invention, in order to correct for dropout in the timing signal track, PLL circuit 50 detects a loss of lock when a dropout occurs and produces a dropout control signal (FIG. 5B) which causes sample and hold circuit 58 to hold the last voltage value before dropout until the dropout ends and PLL circuit 50 phase locks again with the reproduced timing signal. This voltage is applied to VCO 60 which continues to produce a video sampling signal during the dropout period. Consequently there is no loss of accurate recovery of video information and as shown in FIG. 5B, the dropout control signal goes positive during the period of the dropout from time $T_1$ to time $T_2$. During this period, the video sampling signal is continually produced by circuit 54 (FIG. 5C) at the same frequency Mf which the video sampling frequency had before the dropout occurred. As soon as lock is re-established with the timing signal reproduced from tape 36, the dropout control signal returns to a low value (time $T_2$) and phase lock loop circuit 54 resumes tracking of the timing signal from PLL circuit 50.

Although the invention has been described in detail with particular reference to a preferred embodiment thereof, it will be understood that variations and modifications can be effected within the spirit and scope of the invention as described hereinabove and as defined in the appended claims.

What is claimed is:

1. In video reproduction apparatus in which video information is recorded in a plurality of longitudinal video tracks on recording media, and in which a timing signal is recorded in a timing track parallel to the video information tracks, timing signal dropout compensation circuit comprising:

means for reproducing a timing track signal from said timing track on said recording media at it is moved past said reproducing means, wherein said timing signal is susceptible to changes in frequency caused by variations in speed of said recording media as it is moved past said reproducing means;

first phase lock loop (PLL) circuit means for producing a first phase locked timing signal which is phase locked to and has the same frequency as said timing track signal reproduced from said media, said first PLL circuit means including means for producing a dropout control signal which is a function of a loss of lock of said reproduced timing track signal caused by a dropout in said timing track signal;

second phase lock loop circuit means for producing a video sampling signal which is used in the reproduction of said video information from said media and which is phase locked to said first phase locked timing signal and which has a frequency which is a multiple of said first phase locked timing signal, said second PLL circuit means being responsive to said dropout control signal produced by said first PLL circuit means to continue to produce said video sampling signal during the period of said timing track signal dropout;

wherein said first and second PLL circuit means have loop bandwidths which are sufficient to follow frequency variations in the timing track signal reproduced from the recording media without loss of lock of the timing track signal.

2. The compensation circuit of claim 1 wherein said second phase lock loop circuit means includes a voltage controlled oscillator for producing a sampling signal having a frequency Mf and a sample and hold circuit which supplies a voltage control signal to said voltage controlled oscillator and wherein said sample and hold circuit is responsive to said dropout control signal to hold the last voltage control signal during the duration of the dropout of said reproduced timing track signal so that an uninterrupted sampling signal is produced by said voltage controlled oscillator during said dropout period.

3. In magnetic tape reproduction apparatus in which video information is recorded in a plurality of longitudinal video tracks on magnetic tape and in which a timing signal is recorded in a timing track parallel to the video information tracks, a timing signal dropout compensation circuit comprising:

means for simultaneously reproducing from said magnetic tape (1) a timing track signal from said timing track and (2) a plurality of video information signals from said video information tracks, wherein said timing track signal and said plurality of video information signals are susceptible to comparable changes in frequency caused by variations in speed (flutter) of said magnetic tape as it is moved past said reproducing means;

phase lock loop (PLL) circuit means for producing a video sampling signal which is used in sampling said video information signals, which has a frequency that is a multiple of the frequency of said timing track signal and which is phase locked to said timing track signal, wherein said PLL circuit means has a loop bandwidth which is sufficient to follow flutter induced frequency variations in said timing track signal without loss of lock thereof; and means for detecting a dropout in said reproduced timing track signal and for producing a dropout control signal which causes said PLL circuit means to continue to produce said video sampling signal during the period of said timing track signal dropout.

4. The timing signal dropout compensation circuit of claim 3 wherein said dropout detecting means includes timing signal phase lock loop means for producing a first phase locked timing signal which is phase locked to and has the same frequency as said reproduced timing track signal and further includes means for detecting a loss of lock of said reproduced timing track signal and for producing said dropout control signal during detection of said loss of lock.

* * * * *